United States Patent Office 3,557,107
Patented Jan. 19, 1971

3,557,107
PHENYLPIPERAZINYLALKYL ALKOXY ANTHRANILATES
Jerome Marshall Cinnamon, North Caldwell, and William Oroshnik, Plainfield, N.J., assignors to Shulton, Inc., Clifton, N.J., a corporation of New Jersey
No Drawing. Filed May 1, 1967, Ser. No. 634,854
Int. Cl. C07d 51/70
U.S. Cl. 260—268                                           1 Claim

ABSTRACT OF THE DISCLOSURE

The compounds of this invention manifest central nervous system depressant activity in many animals and possess antipsychotic and/or anti-anxiety characteristics. They are anthranilates and their corresponding 2-nitro benzoate derivatives containing at least one alkoxy or methylenedioxy group in the benzene ring of the benzoate moiety and a phenyl or substituted phenyl piperazinyl group attached to the alkyl group.

BACKGROUND OF THE INVENTION

The field of invention is phenylpiperazinylalkyl esters of alkoxy substituted anthranilic acids and their corresponding 2-nitro benzoic acid derivatives.

U.S. Pat. 3,038,901, granted on June 12, 1962, discloses phenylpiperazinylalkyl esters of alkoxy substituted benzoic acids.

The presence of the amino group in the 2-position of the benzene ring of the benzoate significantly enhances the central nervous system depressant activity of the anthranilates of this invention. The corresponding 2-nitro benzoic acid derivatives of this invention, which have less central nervous system activity, are useful as intermediates in the production of the anthranilates of this invention.

SUMMARY OF INVENTION

This invention relates to 2-amino and 2-nitro benzoates, and more particularly to basically substituted alkoxy anthranilates, their corresponding 2-nitro compounds and the non-toxic salts of all such compounds.

The basically substituted alkoxy benzoates of this invention are new compounds having the following formula:

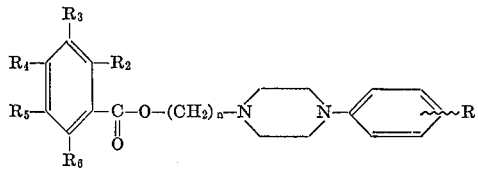

in which R is hydrogen, halogen, lower alkyl, lower alkoxy or trifluoromethyl; $R_2$ is nitro or amino; $R_3$, $R_4$, $R_5$ and $R_6$ are hydrogen, lower alkoxy or connected to a methylenedioxy group, at least one of $R_3$, $R_4$, $R_5$ and $R_6$ being a lower alkoxy or connected to a methylenedioxy group; and $n$ is a whole number within the range of 2 through 4. The lower alkoxy and lower alkyl groups desirably have less than 4 carbon atoms. The halogen of the substituted phenyl may be, for example, fluorine or chlorine.

The compounds of this invention manifest central nervous system depressant activity in many animals in dosages from 0.3 to 30 mg./kg. of body weight for the more active compounds and from 30 to 300 mg./kg. of body weight for the less active compounds. They possess anti-psychotic and anti-anxiety characteristics. They are also useful as sedatives and tranquilizers in the treatment of animals.

Compounds of this invention were screened in mice by the Irwin Screening Protocol in accordance with the procedure described in a paper presented at the Postgraduate Course on Animal and Clinical Pharmacological Techniques in Drug Evaluation at Hahnemann Medical College and Hospital of Philadelphia, Feb. 4–15, 1963, published by Year Book Medical Publishers, 1963. The results indicate the compounds are potent central nervous system depressants with neuropharmacological profiles resembling that of chlorpromazine in some instances and chlordiazepoxide in other cases.

The new compositions of this invention may be produced by reacting the corresponding 2-nitro substituted benzoyl chloride with the required alcohol in accordance with the following reaction:

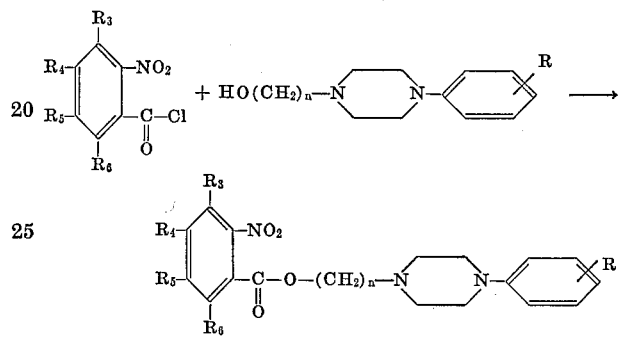

The basically substituted alkoxy aminobenzoates are produced from the corresponding 2-nitro compound by catalytic reduction with a suitable catalyst, such as Raney nickel or palladium-on-carbon, in accordance with the following reaction:

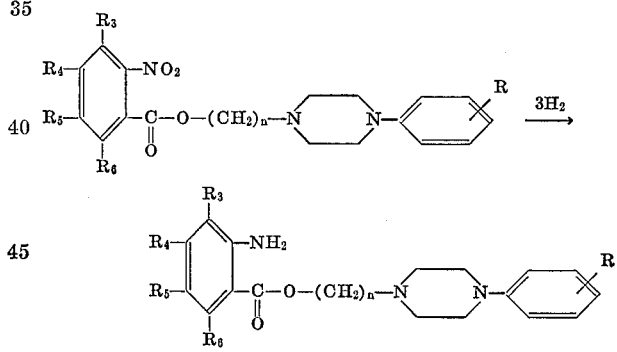

Alternatively, the monohydrochloride of the 2-nitro compound may be similarly reduced to the monohydrochloride of the basically substituted alkoxy aminobenzoate.

To produce the substituted alkoxy-2-nitro benzoyl chloride which is employed in the reaction for preparing the 2-nitro compound corresponding to the basically substituted alkoxy benzoate of this invention, a substituted alkoxy benzoic acid is first nitrated in accordance with the following reaction:

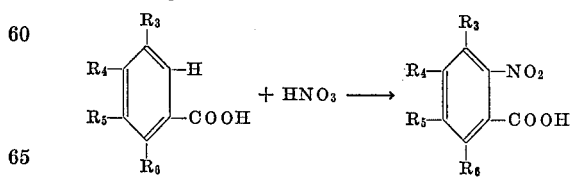

The preparation of 2-nitro-4-methoxybenzoic acid requires an indirect synthesis in order to locate the nitro group in the desired position. The preparation of 2-nitro-4-methoxy-toluene may be achieved in accordance with the method of M. Capisarow, J. Chem. Soc., 1929, 251 (1929) and the subsequent oxidation may be carried out with permanganate using the method of J. L. Warnell, Biochem. Preparations, 6, 22 (1958). The reaction sequence may be illustrated as follows:

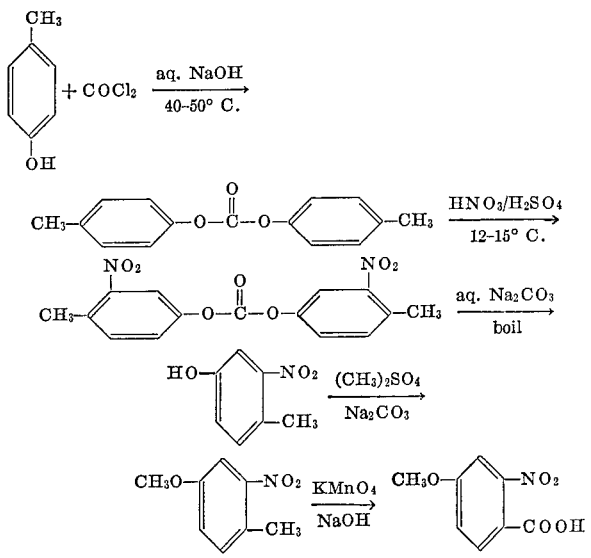

The preparation of 2-nitro-5-methoxybenzoic acid also requires an indirect synthesis. The preparation of 2-nitro-5-methoxy-toluene may be achieved in accordance with the method of K. Blaikie and W. Perkin, J. Chem. Soc., 1924, 307 (1924) and the subsequent oxidation may be carried out with permanganate using the method of K. Roberts, L. Wiles and B. Kent, J. Chem. Soc., 1932, 1792 (1932). The reaction sequence may be illustrated as follows:

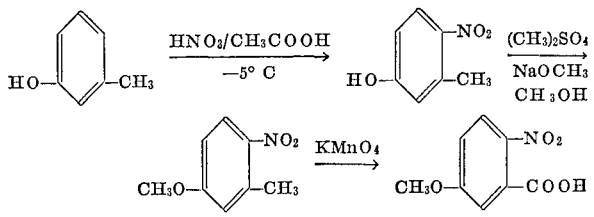

The resulting 2-nitro benzoic acid is then reacted with thionyl chloride in accordance with the following reaction:

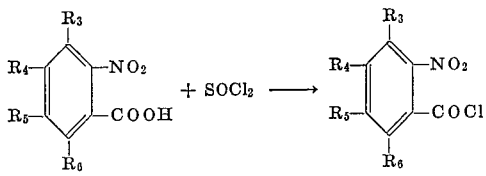

The required alcohol used as the other reactant to produce the 2-nitro compound corresponding to the basically substituted alkoxy aminobenzoates is prepared by reacting an aryl piperazine with a chlorohydrin and anhydrous sodium carbonate in a suitable solvent such as isopropanol. The reaction is as follows:

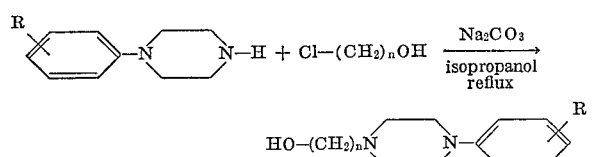

Mono- di- and tri-non-toxic acid addition salts of the basically substituted alkoxy benzoates and mono- and di-non-toxic acid addition salts of the corresponding nitro compounds of such benzoates are produced by mixing stoichiometric amounts of the required benzoate or its corresponding 2-nitro compound and the required acid in an inert solvent such as ether, ethanol, benzene or toluene, and subsequently filtering the precipitated salt or evaporating the solvent and recovering the solid residue. Salts of inorganic acids such as hydrochloric, sulfuric or phosphoric acid or salts of organic acids, such as acetic, succinic, tartaric or citric acid of the basically substituted alkoxy benzoates or their corresponding 2-nitro compounds may be produced in this manner.

Conveniently, the compounds of this invention, such as the basically substituted alkoxy benzoates of Examples I through XVI are associated with solid or liquid pharmaceutically acceptable carriers for oral or parenternal administration in the treatment of behavior disturbances in animals. The compounds and carriers may be in the form of capsules, tablets, powders, sterile solutions of water or other pharmaceutically acceptable solvent or other dosage forms. The compounds may be admixed with diluentes and adjuvents, such as lactose, gums, stearic acid or talc.

DESCRIPTION OF PREFERRED EMBODIMENTS

A more comprehensive understanding of this invention is obtained by reference to the following examples:

EXAMPLE I 2-(4-phenyl-1-piperazinyl)ethyl 2-amino-4,5-dimethoxybenzoate (A) 2-(4-phenyl - 1 - piperazinyl)ethyl 2-nitro-4,5-dimethoxybenzoate.—A solution of 1-phenyl-4-(2-hydroxyethyl)piperazine (6.19 g., 0.030 mole) in chloroform (50 ml.) was added to a stirred solution of 2-nitro-4,5-dimethoxybenzoyl chloride (7.35 g., 0.030 mole) in chloroform (50 ml.). The mixture was refluxed for two hours and stirred for an additional 18 hours at ambient temperature. The chloroform was removed under reduced pressure on a water bath and the residue was stirred with a mixture of 10% sodium carbonate solution (100 ml.) and methylene chloride (100 ml.). The methylene chloride solution was separated, dried over sodium sulfate and evaporated to dryness under reduced pressure on a water bath to give 12.2 g. of crude yellow product which was recrystallized from isopropanol to give 5.5 g. (44% yield) of yellow needles, M.P. 102–104° C. The analytical sample was recrystallized from isopropanol as yellow needles, M.P. 107–108° C.

*Analysis.*—Calc'd. for $C_{21}H_{25}N_3O_6$ (percent): C, 60.71; H, 6.07; N, 10.12. Found (percent): C, 60.94; H, 6.06; N, 10.50.

(B) 2-(4-phenyl - 1-piperazinyl)ethyl 2-amino-4,5-dimethoxybenzoate.—A solution of 2-(4 - phenyl-1-piperazinyl) ethyl 2 - nitro - 4,5-dimethoxybenzoate (1.81 g. 0.004 mole) in methanol (200 ml.) was catalytically reduced over Raney nickel (2 g.) under 3 atmospheres of hydrogen. The mixture was warmed under nitrogen to assure solution of the reduced product and the catalyst was removed by filtration. The filtrate was evaporated to dryness under reduced pressure on a water bath and the residue was recrystallized from methanol to give 0.6 g. (36% yield) of tan needles, M.P. 129–131° C. The analytical sample was recrystallized from methanol as colorless needles, M.P. 130.5–132.5° C.

*Analysis.*—Calc'd. for $C_{21}H_{27}N_3O_4$ (percent): C, 65.41; H, 7.06; N, 10.91. Found (percent): C, 65.62; H, 7.08; N, 11.04.

EXAMPLE II 3-(4-phenyl-1-piperazinyl)propyl 2-amino-4,5-dimethoxybenzoate (A) 3-(4-phenyl-1-piperazinyl)propyl 2 - nitro-4,5-dimethoxybenzoate hydrochloride.—A solution of 1-phenyl-4-(3-hydroxypropyl)piperazine (24.9 g., 0.113 mole) in chloroform (100 ml.) was added to a stirred solution of 2-nitro-4,5 - dimethoxybenzoyl chloride (27.7 g., 0.113 mole) in chloroform (100 ml.). The mixture was refluxed for 2 hours, the chloroform was removed under reduced pressure on a water bath and the residue was recrystallized from methanol to give 30.6 g. (58.1% yield) of the monohydrochloride as yellow needles, M.P. 141–143° C.

(B) 3-(4-phenyl-1 - piperazinyl)propyl 2-nitro-4,5-dimethoxybenzoate.—The above monohydrochloride was dissolved in water and treated with sodium carbonate to liberate the free base which was recrystallized from ethyl acetate as colorless needles, M.P. 104–105° C.

*Analysis.*—Calc'd. for $C_{22}H_{27}N_3O_6$ (percent): C, 61.52; H, 6.34; N, 9.79. Found (percent): C, 61.55; H, 6.35; N, 9.79.

(C) 3 - (4-phenyl-1-piperazinyl)propyl 2-amino-4,5-dimethoxybenzoate hydrochloride.—A solution of 3-(4-phenyl-1-piperazinyl)propyl 2 - nitro - 4,5 - dimethoxybenzoate hydrochloride (9.3 g., 0.020 mole) in methanol (250 ml.) was catalytically reduced over Raney nickel (9 g.) under 3 atmospheres of hydrogen. The catalyst was removed by filtration, and the filtrate was concentrated to 75 ml. and cooled to give 5.4 g. (62% yield) of colorless needles, M.P. 184.5–185° C. The analytical sample was recrystallized from methanol as colorless needles, M.P. 185–185.5° C.

*Analysis.*—Calc'd for $C_{22}H_{30}ClN_3O_4$ (percent): C, 60.61; H, 6.94; N, 9.64. Found (percent): C, 60.46; H, 7.06; N, 9.56.

(D) 3 - (4-phenyl-1-piperazinyl)propyl 2 - amino - 4,5-dimethoxybenzoate.—The above monohydrochloride was dissolved in water and treated with sodium carbonate to liberate the free base which was recrystallized from ethyl acetate as colorless needles, M.P. 121–122° C.

EXAMPLE III 4-(4-phenyl-1-piperazinyl)butyl 2-amino-4,5-dimethoxybenzoate (A) 4 - (4-phenyl-1-piperazinyl)butyl 2 - nitro - 4,5-dimethoxybenzoate hydrochloride.—A solution of 1-phenyl-4(4-hydroxybutyl)piperazine (2.34 g., 0.01 mole) in chloroform (50 ml.) was added to a stirred solution of 2-nitro-4,5-dimethoxybenzoyl chloride (2.45 g., 0.01 mole) in chloroform (50 ml.). The mixture was refluxed for 3 hours, the chloroform was removed under reduced pressure on a water bath and the residue was recrystallized from isopropanol to give 4.2 g. (87.5% yield) of yellow needles, M.P. 200–203° C. The analytical sample was recrystallized from isopropanol as yellow needles, M.P. 203–204° C.

*Analysis.*—Calc'd for $C_{23}H_{30}ClN_3O_6$ (percent): C, 57.55; H, 6.30; Cl, 7.39; N, 8.76. Found (percent): C, 57.44; H, 6.33; Cl, 7.56; N, 8.96.

(B) 4 - (4-phenyl-1-piperazinyl)butyl 2 - amino - 4,5-dimethoxybenzoate hydrochloride.—A solution of 4-(4-phenyl-1-piperazinyl)butyl 2-nitro-4,5-dimethoxybenzoate hydrochloride (2.4 g., 0.005 mole) in methanol (125 ml.) was catalytically reduced over Raney nickel (2.5 g.) under 3 atmospheres of hydrogen and the catalyst was removed by filtration. The filtrate was evaporated to dryness under reduced pressure on a water bath and the residue was recrystallized from isopropanol to give 1.9 g. (84.5% yield) of colorless needles, M.P. 167–169° C. The analytical sample was recrystallized several times from isopropanol as colorless needles, M.P. 178–180° C.

*Analysis.*—Calc'd for $C_{23}H_{32}ClN_3O_4$ (percent): C, 61.39; H, 7.17; Cl, 7.88; N, 9.34. Found (percent): C, 61.36; H, 7.18; Cl, 8.01; N, 9.29.

(C) 4 - (4-phenyl-1-piperazinyl)butyl 2 - amino - 4,5-dimethoxybenzoate.—The above monohydrochloride was dissolved in water and treated with sodium carbonate to liberate the free base which was recrystallized from aqueous ethanol as colorless needles, M.P. 96–97° C.

EXAMPLE IV 2-(4-phenyl-1-piperazinyl)ethyl 2-amino-4-methoxybenzoate (A) 2 - (4-phenyl-1-piperazinyl)ethyl 2 - nitro - 4-methoxybenzoate.—A solution of 1-phenyl-4-(2-hydroxyethyl) piperazine (4.1 g., 0.020 mole) in chloroform (100 ml.) was added dropwise to a stirred solution of 2-nitro-4-methoxybenzoyl chloride (4.3 g., 0.020 mole) in chloroform (200 ml.). The mixture was refluxed for 2 hours, the chloroform was removed under reduced pressure on a water bath and the residue was dissolved in water. The aqueous solution was made basic with sodium carbonate and then extracted with methylene chloride. The extracts were dried over sodium sulfate, filtered and evaporated to dryness under reduced pressure on a water bath. The residue was recrystallized from ethyl acetate to give 2.5 g. (32% yield) of yellow needles, M.P. 71–72° C. The analytical sample was recrystallized from ethyl acetate as pale yellow needles, M.P. 71–72° C.

*Analysis.*—Calc'd for $C_{20}H_{23}N_3O_5$ (percent): C, 62.32; H, 6.01; N, 10.90. Found (percent): C, 62.36; H, 6.06; N, 10.87.

(B) 2 - (4-phenyl-1-piperazinyl)ethyl 2 - amino - 4-methoxybenzoate.—A solution of 2-(4-phenyl-1-piperazinyl)ethyl 2-nitro-4-methoxybenzoate (1.93 g., 0.005 mole) in ethyl acetate (200 ml.) was catalytically reduced over Raney nickel (2 g.) under 3 atmospheres of hydrogen. The catalyst was removed by filtration and the filtrate was evaporated to dryness under reduced pressure on a water bath. The residue was recrystallized from a mixture of ethyl acetate and hexane to give 1.5 g. (84% yield) of colorless plateless, M.P. 107–9°C. The analytical sample was recrystallized from a mixture of ethyl acetate and hexane as colorless platelets, M.P. 108–9° C.

*Analysis.*—Calc'd for $C_{20}H_{25}N_3O_3$ (percent): C, 67.58; H, 7.09; N, 11.82. Found (percent): C, 67.86; H, 6.89; N, 12.02.

EXAMPLE V 3-(4-phenyl-1-piperazinyl)propyl 2-amino-4-methoxybenzoate (A) 3 - (4-phenyl-1-piperazinyl)propyl 2 - nitro - 4-methoxybenzoate.—A solution of 1-phenyl-4-(3-hydroxypropyl)piperazine (4.4 g., 0.020 mole) in chloroform (100 ml.) was added dropwise to a stirred solution of 2-nitro-4-methoxybenzoyl chloride (4.3 g., 0.020 mole) in chloroform (200 ml.). The mixture was refluxed for 2 hours and worked up as in Example IV for 2-(4-phenyl-1-piperazinyl)ethyl 2-nitro-4-methoxybenzoate to give 5.0 g. (63% yield) of yellow needles, M.P. 62–65° C. The analytical sample was recrystallized from a mixture of ethyl acetate and hexane as pale yellow needles, M.P. 62–63° C.

*Analysis.*—Calc'd for $C_{21}H_{25}N_3O_5$ (percent): C, 63.14; H, 6.31; N, 10.52. Found (percent): C, 62.92; H, 6.37; N, 10.39.

(B) 3 - (4-phenyl-1-piperazinyl)propyl 2 - amino - 4-methoxybenzoate.—A solution of 3-(4-phenyl-1-piperazinyl)propyl 2-nitro-4-methoxybenzoate (2.0 g., 0.005 mole) in ethyl acetate (200 ml.) was catalytically reduced over Raney nickel (2.0 g.) under 3 atmospheres of hydrogen. The catalyst was removed by filtration and the filtrate was evaporated to dryness under reduced pressure on a water bath. The residue was recrystallized from hexane to give 1.7 g. (92% yield) of colorless needles, M.P. 76–78° C. The analytical sample was recrystallized from hexane as colorless needles, M.P. 79–80° C.

*Analysis.*—Calc'd for $C_{21}H_{27}N_3O_3$ (percent): C, 68.27; H, 7.37; N, 11.37. Found (percent): C, 68.12; H, 7.22; N, 11.22.

EXAMPLE VI 2-(4-phenyl-1-piperazinyl)ethyl 2-amino-3-methoxybenzoate (A) 2 - (4 -phenyl - 1 - piperazinyl)ethyl 2-nitro-3-methoxybenzoate.—A solution of 1-phenyl-4-(2-hydroxyethyl)piperazine (5.7 g., 0.0278 mole) in benzene (150 ml.) was added dropwise to a stirred solution of 2-nitro-3-methoxybenzoyl chloride (6.0 g., 0.0278 mole) in benzene (100 ml.). The mixture was refluxed for 3 hours and cooled to room temperatures. The yellow solid which separated was filtered and stirred with a mixture of 10% aqueous sodium hydroxide solution (10 ml.) and methylene chloride (50 ml.). The methylene chloride solution was separated, dried over sodium sulfate and evaporated to dryness under reduced pressure on a water bath. The residue was recrystallized from a mixture of ethyl acetate and hexane to give 2.25 g. (21% yield) of pale yellow solid, M.P. 107–108° C. The analytical sample was recrystallized from ethyl acetate as pale yellow needles, M.P. 107–108° C.

*Analysis.*—Calc'd for $C_{20}H_{23}N_3O_5$ (percent): C, 62.32; H, 6.01; N, 10.90. Found (percent): C, 62.38; H, 5.98; N, 10.82.

(B) 2 - (4 - phenyl - 1 - piperazinyl)ethyl 2-amino-3-methoxybenzoate.—A solution of 2-(4-phenyl-1-piperazinyl)ethyl 2-nitro-3-methoxybenzoate (1.0 g., 0.0026 mole) in ethyl acetate (100 ml.) was catalytically reduced over Raney nickel (1 g.) under 3 atmospheres of hydrogen. The catalyst was removed by filtration and the filtrate was evaporated to dryness under reduced pressure on a water bath. The residue was recrystallized from a mixture of ethyl acetate and hexane to give 0.26 g. (28% yield) of colorless solid, M.P. 157–158.5° C. The analytical sample was recrystallized from a mixture of hexane and ethyl acetate as colorless needles, M.P. 157–158.5° C.

*Analysis.*—Calc'd for $C_{20}H_{25}N_3O_3$ (percent): C, 67.58; H, 7.09; N, 11.82. Found (percent): C, 67.50; H, 6.87; N, 11.59.

EXAMPLE VII 3-(4-phenyl-1-piperazinyl)propyl 2-amino-3-methoxybenzoate (A) 3 - (4 - phenyl - 1 - piperazinyl)propyl 2-nitro-3-methoxybenzoate.—A solution of 1-phenyl-4-(3-hydroxypropyl)piperazine (6 g., 0.0278 mole) in benzene (200 ml.) was added dropwise to a stirred solution of 2-nitro-3-methoxybenzoyl chloride (6 g., 0.0278 mole) in benzene (200 ml.). The mixture was refluxed for 3 hours and worked up as in Example VI for 2-(4-phenyl-1-piperazinyl) ethyl 2-nitro-3-methoxybenzoate to give 2.1 g. (19% yield) of colorless solid, M.P. 66–67° C. The analytical sample was recrystallized from a mixture of ethyl acetate and hexane as colorless needles, M.P. 66–67° C.

*Analysis.*—Calc'd for $C_{21}H_{25}N_3O_5$ (percent): C, 63.14; H, 6.31; N, 10.52. Found (percent): C, 63.10; H, 6.25; N, 10.52.

(B) 3 - (4 - phenyl - 1 - piperazinyl)propyl 2-amino-3-methoxybenzoate.—A solution of 3-(4-phenyl-1-piperazinyl)propyl 2-amino-3-methoxybenzoate (1 g., 0.0025 mole) in ethyl acetate (100 ml.) was catalytically reduced over Raney nickel (1 g.) under 3 atmospheres of hydrogen. The catalyst was removed by filtration and the filtrate was evaporated under reduced pressure on a water bath. The residue was recrystallized from hexane to give 0.5 g. (55% yield) of colorless solid, M.P. 69–72° C. The analytical sample was recrystallized from hexane as colorless needles, M.P. 69–72° C.

*Analysis.*—Calc'd for $C_{21}H_{27}N_3O_3$ (percent): C, 68.27; H, 7.37; N, 11.37. Found (percent): C, 68.53; H, 7.02; N, 11.20.

EXAMPLE VIII 3-(4-phenyl-1-piperazinyl)propyl 2-amino-5-methoxybenzoate (A) 3 - (4 - phenyl - 1 - piperazinyl)propyl 2-nitro-5-methoxybenzoate.—A solution of 1-phenyl-4-(3-hydroxypropyl)piperazine (4.4 g., 0.020 mole) in benzene (200 ml.) was added dropwise to a stirred solution of 2-nitro-5-methoxybenzoyl chloride (4.3 g., 0.020 mole) in benzene (100 ml.). The mixture was stirred for 4 hours at ambient temperature and filtered to give 6.9 g. of crude yellow monohydrochloride. The crude monohydrochloride was stirred with a mixture of 10% sodium bicarbonate solution (100 ml.) and methylene chloride (100 ml.). The methylene chloride solution was separated, dried over sodium sulfate and evaporated to dryness under reduced pressure on a water bath. The residue was recrystallized from isopropanol to give 5.8 g. (72.5% yield) of colorless solid, M.P. 90–94° C. The analytical sample was recrystallized from isopropanol as a colorless waxy solid, M.P. 95–96° C.

*Analysis.*—Calc'd for $C_{21}H_{25}N_3O_5$ (percent): C, 63.14; H, 6.31; N, 10.52. Found (percent): C, 63.30; H, 6.24; N, 10.30.

(B) 3 - (4 - phenyl - 1-piperazinyl)propyl 2-amino-5-methoxybenzoate.—A solution of 3-(4-phenyl-1-piperazinyl)propyl 2-nitro-5-methoxybenzoate (2.3 g., 0.0058 mole) in ethyl acetate (250 ml.) was catalytically reduced over Raney nickel (2.3 g.) under 3 atmospheres of hydrogen. The catalyst was removed by filtration and the filtrate was evaporated to dryness under reduced pressure on a water bath. The residue was recrystallized from a mixture of ethyl acetate and hexane to give 1.6 g. (76% yield) of colorless needles, M.P. 50–56° C. The analytical sample was recrystallized several times from a mixture of ethyl acetate and hexane as colorless needles, M.P. 60–61° C.

*Analysis.*—Calc'd for $C_{21}H_{27}N_3O_3$ (percent): C, 68.27; H, 7.37; N, 11.37. Found (percent): C, 68.23; H, 7.32; N, 11.60.

EXAMPLE IX 3-(4-phenyl-1-piperazinyl)propyl 2-amino-4,5-methylenedioxybenzoate (A) 3 - (4 - phenyl - 1 - piperazinyl)propyl 2-nitro-4,5-methylenedioxybenzoate.—A solution of 1-phenyl-4-(3-hydroxypropyl)piperazine (7.5 g., 0.033 mole) in benzene (200 ml.) was added dropwise to a stirred solution of 2-nitro-4,5-methylenedioxybenzoyl chloride (7.5 g., 0.033 mole) in benzene (100 ml.). The mixture was stirred for 4 hours at ambient temperature and filtered to give 12.3 g. of crude hydrochloride which was dissolved in water. The aqueous solution was made basic with sodium carbonate and extracted with ether. The extracts were dried over sodium sulfate, filtered and evaporated to dryness under reduced pressure on a water bath. The residue was recrystallized from hexane to give 8.2 g. (60% yield) of yellow needles, M.P. 62–64° C. The analytical sample was recrystallized from hexane as yellow needles, M.P. 63–64° C.

*Analysis.*—Calc'd for $C_{21}H_{23}N_3O_6$ (percent): C, 61.01; H, 5.61; N, 10.16. Found (percent): C, 61.07; H, 5.62; N, 10.13.

(B) 3 - (4 - phenyl - 1 - piperazinyl)propyl 2-amino-4,5-methylenedioxybenzoate.—A solution of 3-(4-phenyl-1 - piperazinyl)propyl 2 - nitro-4,5-methylenedioxybenzoate (2.3 g., 0.0056 mole) in ethyl acetate (250 ml.) was catalytically reduced over Raney nickel (2 g.) under 3 atmospheres of hydrogen. The catalyst was removed by filtration and hexane was added to the filtrate to precipitate out the product giving 1.9 g. (90% yield) of colorless needles, M.P. 103–108° C. The analytical sample was recrystallized from isopropanol as colorless needles, M.P. 110–111° C.

*Analysis.*—Calc'd for $C_{21}H_{25}N_3O_4$ (percent): C, 65.78; H, 6.57; N, 10.96. Found (percent): C, 65.93; H, 6.71; N, 10.87.

EXAMPLE X 3-(4-phenyl-1-piperazinyl)propyl 2-amino-2,6 - dimethoxybenzoate (A) 3-(4-phenyl-1-piperazinyl)propyl 2 - nitro-3,6-dimethoxybenzoate.—A solution of 3,6-dimethoxybenzoyl chloride (24.6 g., 0.10 mole) in benzene (75 ml.) was added slowly to a vigorously stirred suspension of sodium 3-(4-phenyl-1-piperazinyl)propoxide (24.2 g., 0.10 mole) in benzene (35 ml.) under a nitrogen atmosphere. After stirring for 1 hour at 30–40° C., the solvent was removed under reduced pressure on a water bath and the residue was dissolved in ethyl acetate and filtered to remove the sodium chloride. The filtrate was concentrated under reduced pressure and cooled to give 18.6 g. (43.4% yield) of tan needles, M.P. 135–136: C. The analytical sample was recrystallized from ethyl acetate as yellow needles, M.P. 135–137° C.

Analysis.—Calc'd for $C_{22}H_{27}N_3O_6$ (percent): C, 61.52; H, 6.34; N, 9.79. Found (percent): C, 61.43; H, 6.35; N, 9.78.

(B) 3-(4-phenyl-1-piperazinyl)propyl 2-amino-3,6-dimethoxy-benzoate.—A solution of 3-)4-phenyl-1-piperazinyl)propyl 2-nitro-3,6-dimethoxybenzoate (1.29 g., 0.0030 mole) in ethyl acetate (200 ml.) was catalytically reduced over Raney nickel (1.3 g.) under 3 atmospheres of hydrogen. The catalyst was removed by filtration and the filtrate was evaporated to dryness under reduced pressure on a water bath. The residue was recrystallized from methanol to give 0.9 g. (75% yield) of colorless hygroscopic needles, M.P. 68–68.5° C.

(C) 3-(4-phenyl-1-piperazinyl)propyl 2-amino-3,6-dimethoxybenzoate dihydrochloride.—A solution of 3-(4-phenyl-1-piperazinyl)propyl 2-nitro-3,6-dimethoxybenzoate (1.29 g., 0.0030 mole) was reduced as above, filtered free of catalyst and evaporated to dryness. The residue was dissolved in absolute ethanol, cooled in an ice bath and dry halogen chloride was passed through the solution. On cooling, 0.8 g. (57% yield) of the dihydrochloride separated as tan needles, M.P′ 208–212° C. The analytical sample was recrystallized from absolute ethanol as tan needles, M.P. 217–219° C.

Analysis.—Cal'cd for $C_{22}H_{31}Cl_2N_3O_4$ (percent): C, 55.93; H, 6.61; Cl, 15.01; N, 8.90. Found (percent): C, 55.89; H, 6.54; Cl, 14.91; N, 8.83.

EXAMPLE XI

3-[4-(o-fluorophenyl)-1-piperazinyl]propyl 2-amino-4,5-dimethoxybenzoate (A) 1 - (o-fluorophenyl) - 4-(3-hydroxypropyl)piperazine.—A stirred mixture of 1 - (o-fluorophenyl)piperazine (18.0 g., 0.10 mole), 3-chloropropanol (9.5 g., 0.10 mole) and sodium carbonate (10.6 g., 0.10 mole) in isopropanol (150 ml.) was refluxed for 18 hours. The inorganic salts were filtered off while hot and the filtrate was evaporated under reduced pressure to give 20 g. of crude yellow liquid. The crude product was recrystallized from a mixture of toluene and pentane to give 14.0 g. (59.0% yield of colorless needles( M.P. 77.5–79° C. The analytical sample was recrystallized from a mixture of toluene and pentane as colorless needles, M.P. 77.5–79° C.

Analysis.—Calc'd for $C_{13}H_{19}FN_2O$ (percent): C, 65.52; H, 8.04; F, 7.97; N, 11.76. Found (percent): C, 65.72; H, 8.05; F, 8.39; N, 11.97.

(B) 3-[4-(o-fluorophenyl) - 1 - piperazinyl]propyl 2-nitro-4,5-dimethoxybenzoate.—A solution of 1-(o-fluorophenyl)-4-(3-hydroxypropyol) piperazine (7.15 g., 0.030 mole) in benzene (250 ml.) was added to a stirred solution of 2-nitro-4,5-dimethoxybenzoyl chloride (7.4 g., 0.030 mole) in warm benzene (150 ml.). The reaction mixture was maintained at 50° C. for 1 hour, stirred for an additional 3 hours at ambient temperature and filtered to give 8.5 g. of crude hydrochloride. The hydrochloride was stirred in a mixture of methylene chloride (300 ml.) and 10% sodium carbonate solution (100 ml.. The methylene chloride solution was separated, dried over soduim sulfate and evaporated to dryness under reduced pressure. The residue was recrystallized from a mixture of isobutanol and heptane to give 4 g. (30% yield) of colorless needles, M.P. 83–85° C. The analytical sample was recrystallized from a mixture of isproanol and heptane as colorless needles, M.P. 85–86.5° C.

Analysis.—Calc'd for $C_{22}H_{27}FN_3O_6$ (percent): C, 58.91; H, 6.07; F, 4.14; N, 9.37. Found (percent): C, 58.54; H, 5.79; F, 4.06; N, 9.03.

(C) 3-[4 - (o-fluorophenyl) - 1-piperazinyl]propyl 2-nitro-4,5-dimethoxybenzoate hydrochloride.—A solution of 1 - (o-fluorophenyl)-4-(3-hydroxypropyl) piperazine (2.0 g., 0.0084 mole) in chloroform (50 ml.) was added dropwise to a stirred solution of 4,5-dimethoxybenzoyl chloride (1.7 g., 0.007 mole) in chloroform (50 ml.), refluxed for 3 hours and stirred at ambient temperature for 18 hours. The solvent was removed under reduced pressure on a water bath and the oily residue was crystallized by triturating with ether to give 3.0 g. of yellow solid, M.P. 175–177° C. This material was recrystallized from absolute ethanol to give 2.2 g. (66% yield) of pale yellow needles, M.P. 194–196° C.

(D) 3 - [4-(o-fluorophenyl)-1-piperazinyl]propyl 2-amino-4,5-dimethoxybenzoate.—A solution of 3-[4-(o-fluorophenyl) - 1-piperazinyl] propyl 2 - nitro-4,5-dimethoxybenzoate hydrochloride (2.2 g., 0.0046 mole) in methanol (250 ml.) was catalytically reduced over Raney nickel (2 g.) under 3 atmospheres of hydrogen. The catalyst was removed by filtration and the filtrate was reduced in volume to 50 ml. and cooled to give 1.7 g. (82% yield) of colorless needles, M.P. 216–218° C. The analytical sample was recrystallized from ethanol as colorless needles, M.P. 218–220° C.

Analysis.—Calc'd for $C_{22}H_{29}ClFN_3O_4$ (percent): C, 58.21; H, 6.44; Cl, 7.81; F, 4.19; N, 9.26. Found (percent): C, 58.26; H, 6.41; Cl, 7.77; F, 4.43; N, 8.74.

EXAMPLE XII

3-[4-(m-chlorophenyl)-1-piperazinyl]propyl 2-amino-4,5-dimethoxybenzoate (A) 1 - (m-chlorophenyl)-4-(3-hydroxypropyl)piperazine.—A stirred mixture of m-chlorophenylpiperazine dihydrochloride (25 g., 0.093 mole), 3-chloropropanol (10 g. 0.093 mole) and potassium carbonate (38.3 g., 0.28 mole) in isopropanol (250 ml.) was refluxed for 18 hours. The inorganic salts were filtered off while hot and the filtrate was evaporated under reduced pressure on a water bath. The oily residue was distilled in vacuo to give 5.2 g. (21.5% yield) of colorless oil, B.P. 193–197°/0.3 mm. On standing the oil solidified to give a colorless waxy solid M.P. 85.5–86° C.

Analysis.—Cal'd for $C_{13}H_{19}ClN_2O$ (percent): C, 61.28; H, 7.52; Cl, 13.92; N, 11.00. Found (percent): C, 61.18; H, 7.71; Cl, 13.97; N, 10.89.

(B) 3-[4-(m-chlorophenyl)-1-piperazinyl]propyl 2-nitro-4,5-dimethoxybenzoate.—A solution of 1-(m-chlorophenyl) - 4 - (3-hydroxypropyl)piperazine (5.6 g., 0.022 mole) in chloroform (50 ml.) was added dropwise to a stirred solution of 2-nitro-4,5-dimethoxybenzoyl chloride (5.4 g., 0.022 mole) in chloroform (100 ml.) and refluxed for 3 hours. The solvent was removed under reduced pressure and the residue was stirred with a mixture of 5% aqueous sodium hydroxide solution (20 ml.) and methylene chloride (100 ml.). The methylene chloride was separated, dried over sodium sulfate and evaporated to dryness under reduced pressure on a water bath. The residue was recrystallized from a mixture of ethyl acetate and hexane to give 2.8 g. (27.5% yield) of yellow needles, M.P. 109–110° C. The analytical sample was similarly recrystallized to give yellow needles, M.P. 109–110° C.

Analysis.—Calc'd for $C_{22}H_{26}ClN_3O_6$ (percent): C, 56.82; H, 5.65; Cl, 7.64; N, 9.05. Found (percent): C, 57.01; H, 5.79; Cl, 7.86; N, 8.84.

(C) 3-[4-(m-chlorophenyl) - 1 - piperazinyl]propyl 2-amino-4,5-dimethoxybenzoate hydrochloride.—A solution of 3-[4-(m - chlorophenyl)-1-piperazinyl]propyl 2-nitro-4,5-dimethoxybenzoate (1.0 g., 0.002 mole) in ethyl acetate (100 ml.) was catalytically reduced over Raney nickel (2 g.) under 3 atmospheres of hydrogen. The catalyst was removed by filtration and the filtrate was evaporated to dryness under reduced pressure on a water bath. The oily residue was dissolved in benzene and dry hydrogen chloride was passed through the solution to precipitate the hydrochloride. The crude hydrochloride was recrystallized from a mixture of isopropanol and benzene to give 0.55 g. (54.5% yield of colorless needles, M.P. 193–196° C.

*Analysis.*—Calc'd for $C_{22}H_{30}Cl_2N_3O_4$ (percent): C, 56.17; H, 6.21; Cl, 14.17; N, 8.93. Found (percent): C, 56.09; H, 6.24; Cl, 14.59; N, 8.83.

EXAMPLE XIII

2-[4-(o-tolyl)-1-piperazinyl]ethyl 2-amino-4,5-dimethoxybenzoate (A) 2-[4-(o - tolyl)-1-piperazinyl]ethyl 2-nitro-4,5-dimethoxybenzoate.—This compound may be prepared by adding a solution of 1-(o-tolyl)-4-(2-hydroxypropyl)piperazine (4.85 g., 0.022 mole) in chloroform (50 ml.) to a stirred solution of 2-nitro-4,5-dimethoxybenzoyl chloride (5.4 g., 0.022 mole) in chloroform (100 ml.) and refluxing the mixture for 3 hours. The product may be isolated by following the procedure described for the preparation of 3-[4-(m-chlorophenyl)-1-piperazinyl]propyl 2-nitro-4,5-dimethoxybenzoate in Example XII.

(B) 2-[4-(o-tolyl)-1-piperazinyl]ethyl 2-amino-4,5-dimethoxybenzoate.—This compound may be prepared by reducing the above nitro compound (0.86 g., 0.002 mole) as described for the preparation of 3-[4-(m-chlorophenyl)-1-piperazinyl]propyl 2-amino-4,5-dimethoxybenzoate in Example XII.

EXAMPLE XIV

3-[4-(p-methoxyphenyl)-1-piperazinyl]propyl 2-amino-4,5-dimethoxybenzoate (A) 1-(p-methoxyphenyl)-4-(3-hydroxypropyl)piperazine.—A stirred mixture of p-methoxyphenylpiperazine dihydrochloride (26.5 g., 0.10 mole), 3-choropropanol (10.4 g., 0.10 mole) and sodium carbonate (33 g., 0.6 mole) in isopropanol (250 ml.) was refluxed for 18 hours. The inorganic salts were filtered off while hot and the filtrate was evaporated under reduced pressure on a water bath. The residue was recrystallized from ethyl acetate to give 8.4 g. (34% yield) of tan needles, M.P. 87–88° C.

*Analysis.*—Calc'd for $C_{14}H_{22}N_2O_2$ (percent): C, 67.18; H, 8.86; N, 11.20. Found (percent): C, 67.39; H, 8.71; N, 11.16.

(B) 3-[4-(p - methoxyphenyl)-1-piperazinyl]propyl 2-nitro-4,5-dimethoxybenzoate dihydrochloride.—A solution of 1 - (p-methoxyphenyl)-4-(3-hydroxypropyl)piperazine (3.25 g., 0.016 mole) in chloroform (150 ml.) was added dropwise to a stirred solution of 4,5-dimethoxybenzoyl chloride (3.95 g., 0.016 mole) in chloroform (250 ml.) and stirred for 3 hours at ambient temperature. The solvent was evaporated under reduced pressure on a water bath. The residue could not be crystallized and the dihydrochloride was precipitated by passing dry hydrogen chloride into a solution of the free base in isopropanol. The dihydrochloride was filtered and recrystallized from isopropanol to give 1.4 g. (17% yield) of yellow solid, M.P. 151–152° C.

(C) 3-[4-(p - methoxyphenyl)-1-piperazine]propyl 2-amino-4,5-dimethoxybenzoate trihydrochloride.—A solution of 3-[4-(p-methoxyphenyl)-1-piperazinyl]propyl 2-nitro-4,5-dimethoxybenzoate dihydrochloride (1.0 g., 0.0019 mole) in ethanol (150 ml.) was catalytically reduced over Raney nickel (1.0 g.) under 3 atmospheres of hydrogen. The catalyst was removed under reduced pressure and dry hydrogen chloride was passed through the solution. The trihydrochloride was filtered and recrystallized from ethanol to give 0.4 g. (40% yield) of tan powder, M.P. 155–158° C.

*Analysis.*—Calc'd for $C_{23}H_{34}Cl_3N_3O_5$ (percent): C, 51.26; H, 6.36; N, 7.80. Found (percent): C, 51.48; H, 6.20; N, 7.96.

EXAMPLE XV

3-[4-(m-trifluoromethylphenyl)-1-piperazinyl]propyl 2-amino-4,5-dimethoxybenzoate (A) 1-(m-trifluoromethylphenyl)-4-(3-hydroxypropyl) piperazine.—A stirred mixture of m-trifluoromethylphenylpiperazine (32.2 g., 0.14 mole), 3-chloropropanol (13.3 g., 0.14 mole) and sodium carbonate (14.8 g., 0.14 mole) in isopropanol (200 ml.) was refluxed for 24 hours. The inorganic salts were filtered off while hot and the filtrate was evaporated under reduced pressure on a water bath. The oily residue was distilled in vacuo to give 23.4 g. (58.0% yield) of colorless liquid, B.P. 145–150° C./0.1 mm., $n_D^{20}$ 1.5199.

(B) 3 - [4 - (m-trifluoromethylphenyl)-1-piperazinyl] propyl 2-nitro-4,5-dimethoxybenzoate.—A solution of 1-(m - trifluoromethylphenyl) - 4 - 3 - (3 - hydroxypropyl) piperazine (8.65 g., 0.030 mole) in chloroform (50 ml.) was added dropwise to a stirred solution of 4,5-dimethoxybenzoyl chloride (7.34 g., 0.030 mole in chloroform (100 ml.). The mixture was refluxed for 2 hours and stirred for an additional 3 hours at ambient temperature. The solvent was evaporated under reduced pressure on a water bath and the residue was stirred with a mixture of 10% aqueous sodium carbonate (100 ml.) and methylene chloride (100 ml.). The methylene chloride solution was separated, dried over sodium sulfate and evaporated to dryness under reduced pressure. The residue was recrystallized from ethyl acetate to give 12.1 g. (81% yield) of colorless needles, M.P. 147–148° C.

(C) 3 - [4-(m-trifluoromethylphenyl)-1-piperazinyl]-propyl 2 - amino - 4,5 - dimethoxybenzoate dihydrochloride.—A solution of 3-[4-(m-trifluoromethylphenyl)-1-piperazinyl] propyl 2-nitro-4,5-dimethoxybenzoate (2.49 g., 0.00050 mole) in ethyl acetate (300 ml.) was catalytically reduced over Raney nickel (2.5 g.) under 3 atmospheres of hydrogen. The catalyst was removed by filtration and the filtrate was evaporated under reduced pressure. The oily residue was dissolved in absolute ethanol and a 5% solution of hydrogen chloride in ethanol (5 ml.) was added to give 1.2 g. (50% yield) of the dihydrochloride as a colorless powder, M.P. 213–215° C.

Example XVI 3-(4-phenyl-1-piperazinyl)propyl 2-amino-4,5-diethoxybenzoate (A) 3 - (4 - phenyl-1-piperazinyl)propyl 2-nitro-4,5-diethoxybenzoate dihydrochloride.—A stirred mixture of 1-phenyl-4-(3-hydroxypropyl) piperazine (4.0 g., 0.019 mole) in chloroform (50 ml.) was added dropwise to a stirred solution of 2-nitro-4,5-diethoxybenzoyl chloride (5.2 g., 0.019 mole) in chloroform (50 ml.). The mixture was refluxed for 2 hours and stirred for an additional 18 hours at ambient temperature. The solvent was evaporated under reduced pressure on a water bath and the residue was stirred with a mixture of 10% aqueous sodium carbonate (50 ml.) and methylene chloride (100 ml.). The methylene chloride was evaporated under reduced pressure on a water bath and the oily residue was dissolved in isopropanol. Dry hydrogen chloride was passed through the solution and the dihydrochloride separated to give 5.5 g. (55% yield) of colorless powder, M.P. 126° C. with decomposition.

(B) 3 - (4 - phenyl-1-piperazinyl)propyl 2-amino-4-5-diethoxybenzoate dihydrochloride.— A solution of 3-(4-phenyl-1-piperazinyl)propyl 2-nitro-4,5-diethoxybenzoate dihydrochloride (2.65 g., 0.005 mole) in methanol (250 ml.) was catalytically reduced over 5% palladium-on-carbon (0.5 g.). The catalyst was removed by filtration and the filtrate was evaporated under reduced pressure on a water bath. The residue was recrystallized from isopropanol to give 0.7 g. (25% yield) of pale pink powder, M.P. 179–181° C.

Example XVII

The composition of the invention may be combined with pharmaceutically acceptable carriers to produce desired dosage unit forms. For example, 3-(4-phenyl-1-piperazinyl)propyl 2-amino - 4,5-dimethoxybenzoate hydrochloride may be produced in different dosage unit forms, such as different types of tablets, capsules and injectables.

The following is a tablet formulation which is utilized in situations in which the presence of water is not desirable or may contribute to the instability of the resulting tablet.

|  | Mg. |
|---|---|
| 3 - (4 - phenyl-1-piperazinyl)propyl 2-amino-4,5-dimethoxybenzoatehydrochloride | 30 |
| Lactose | 50 |
| Starch | 85 |
| Ethyl cellulose 5% sol | 15 |
| Talc | 18 |
| Magnesium stearate | 2 |
| Total | 200 |

The 3-(4-phenyl-1-piperazinyl)propyl 2-amino-4,5-dimethoxybenzoate hydrochloride is uniformly mixed with lactose and a portion of the starch (25 mg.). The binder, ethyl cellulose, is prepared by making a 5% solution in anhydrous ethyl alcohol. The mixture containing the benzoate is granulated with the ethyl cellulose solution. Anhydrous ethyl alcohol may be added at this stage to obtain satisfactory wet granules. The mixture is wet screened through an appropriate size screen, for example #8 stainless steel screen, and the granulations are dried at room temperature. The mixture is then dry screened through #20 stainless steel screen. The remaining starch, talc, and magnesium stearate are incorporated by mixing thoroughly with the other ingredients. The mixture is then incorporated in tablets.

This following formulation makes use of a typical "wet" granulation procedure:

|  | Mg. |
|---|---|
| 3 - (4 - phenyl-1-piperazinyl)propyl 2-amino-4,5-dimethoxybenzoatehydrochloride | 30 |
| Starch | 70 |
| Acacia | 10 |
| Lactose | 88 |
| Magnesium stearate | 2 |
| Total | 200 |

The benzoate, part of the starch and part of the acacia are uniformly mixed. A paste is prepared with the remaining portion of the starch and acacia and this paste is employed to granulate the mixture containing the benzoate. The resulting granulate is wet screened through an appropriate size screen and dried at room temperature. It is then dry screened and any remaining starch together with lactose and magnesium stearate are added to the dry granulation. All ingredients are then thoroughly mixed and the resulting mixture is compressed into tablets.

The following formulation utilizes as a granulation procedure, the "pre-compression" or "slugging" method. Such procedure is conducted in the absence of water and nonaqueous liquids. The formation is as follows:

|  | Mg. |
|---|---|
| 3 - (4 - phenyl - 1-piperazinyl)propyl 2-amino-4,5-dimethoxybenzoate hydrochloride | 30 |
| Lactose | 98 |
| Talc | 30 |
| Magnesium stearate | 2 |
| Starch | 40 |
| Total | 200 |

The benzoate, lactose, talc and 50% of the starch are thoroughly mixed. The mixture is compressed into "slugs" using a ¾ inch punch. The compressed "slugs" are oscillated through an appropriate size screen (either #14 or #16). To the resulting dry granulation the remaining starch together with magnesium stearate is added. The complete granulation is mixed until uniform and the tablets are compressed.

Tabletting when a small percentage of active benzoate is incorporated may be achieved by direct compression. Several methods are available for this purpose. Two methods are illustrated in this example.

One illustration of direct compression is the following formulation:

|  | Mg. |
|---|---|
| 3 - (4 - phenyl - 1-piperazinyl)propyl 2-amino-4,5-dimethoxybenzoate hydrochloride | 30 |
| Spray dried lactose | 158 |
| Starch | 10 |
| Magesium stearate | 2 |
| Total | 200 |

The spray dried lactose, the magnesium stearate and the benzoate are mixed uniformly and then compressed directly into tablets.

Another method of direct compressed tablet involves the utilization of commercially available mixtures such as that sold under the name Emcompress, manufactured by Edward Mendell Co. This mixture has all the necessary ingredients of the tablet, such as diluent, disintegrant and lubricant added to it. A typical formula of Emcompress is as follows:

|  | Parts |
|---|---|
| Dicalcium phosphate, dihydrate | 89.0 |
| Starch USP | 7.5 |
| Magnesium stearate | 1.0 |
| Microcrystalline cellulose | 2.5 |
|  | 100.0 |

The benzoate may be incorporated in the Emcompress as in the following formulation:

|  | Mg. |
|---|---|
| 3 - (4 - phenyl - 1-piperazinyl)propyl 2-amino-4,5-dimethoxybenzoate hydrochloride | 30 |
| Emcompress | 160 |
| Landalgine P–HS | 10 |
| Total | 200 |

Capsules are also a convenient and at times advantageous dosage form. Hard and soft gelatin capsules are used. Usually the active material such as the benzoate is mixed with a suitable quantity of lactose until uniform and the capsules are either filled by hand or by suitable machinery.

One suitable capsule formula is as follows:

|  | Mg. |
|---|---|
| 3 - (4 - phenyl - 1-piperazinyl)propyl 2-amino-4,5-dimethoxybenzoate hydrochloride | 30 |
| Lactose q.s. to | 300 |

An injectable dosage form may be prepared by dissolving or suspending the benzoate in a suitable vehicle, such as pyrogen free water or an oil base. Such vehicle should meet official governmental specifications.

With water based vehicles, sodium chloride may be added to obtain an isotonic solution. Procaine hydrochloride may be added as a local anesthetic to minimize irritation, and a suitable preservative may be added. Such a preservative may be, for example, benzyl alcohol, methyl and propyl parabens, benzalkonium chloride (1:10,000), phenyl mercuric nitrate (1:50,000) or suitable mixtures of such preservatives.

A typical injectable formulation is:

3 - (4 - phenyl - 1-piperazinyl)propyl 2-amino-4,5-dimethoxybenzoate hydrochloride—30 mg.
Procaine hydrochloride—10 mg.
Sodium chloride for isotonicity—q.s.
Benzalkonium chloride—1:10,000
Water for injection—q.s. to 1.0 ml.

To prepare such injectables, procaine hydrochloride benzalkonium chloride, sufficient sodium chloride to obtain isotonicity and finally the benzoate are added together. The product is manufactured under sterile conditions, filtered and filled into suitable containers, either single dose ampules or multi-dose vials.

We claim:
1. 3 - (4 - phenyl-1-piperazinyl)propyl 2-amino-4,5-dimethoxybenzoate or a non-toxic acid addition salt thereof.

References Cited

UNITED STATES PATENTS

| 2,383,074 | 8/1945 | Parker | 260—268X |
| 2,596,156 | 5/1952 | Krimmel | 260—268X |
| 2,836,594 | 5/1958 | Parcell | 260—268 |
| 2,928,834 | 3/1960 | Shapiro | 260—268 |
| 3,025,297 | 3/1962 | Robinson | 260—268 |
| 3,038,901 | 6/1962 | Hayao | 260—268 |
| 3,201,401 | 8/1965 | Krapcho | 260—268 |
| 3,238,203 | 3/1966 | Krapcho | 260—268X |

DONALD G. DAUS, Primary Examiner

U.S. Cl. X.R.

260—463, 544, 645, 688, 689; 424—250